3,484,353
POLYMER HYDROPEROXIDE
Dexter B. Sharp, St. Louis, Mo., assignor to Monsanto Company, St. Louis, Mo., a corporation of Delaware
No Drawing. Filed July 15, 1965, Ser. No. 472,328
Int. Cl. C07c *3/24;* C08d *1/00;* B01j *1/10*
U.S. Cl. 204—159.23                9 Claims

ABSTRACT OF THE DISCLOSURE

Polymer hydroperoxides are prepared by contacting polymers containing intralinear C=C unsaturation with light and oxygen in the presence of a photosensitizing catalyst. Photo prepared hydroperoxide polymers produce clear, transparent films not previously attainable.

---

This invention relates to the preparation of hydroperoxide derivatives of polymers containing intralinear C=C unsaturation in the polymeric chain. This invention further relates to novel polymers characterized by a plurality of hydroperoxide groups attached to carbon atoms in the polymer chain.

The term "polymer hydroperoxide" as used herein means a polymer characterized by a plurality of carbon-to-carbon double bonds and a plurality of oxygen-containing groups attached to carbon atoms in the polymer chain, the major amount of said oxygen-containing groups being hydroperoxide groups.

The novel polymer hydroperoxides of this invention are prepared by a process which comprises contacting polymers containing intralinear C=C unsaturation with light and oxygen in the presence of photosensitizing catalyst. The photooxidation is effected under conditions such that at least a major amount of the hydroperoxide substituent groups formed remain attached to carbon atoms in the polymer chain as hydroperoxide groups thus enabling the polymer to be used in many applications not heretofore possible with prior art oxidized polymers.

The oxidized polymers of the prior art are prepared by the usual autocatalytic oxidations wherein a multiplicity of oxygenated functions other than hydroperoxide groups are formed on the polymer chain, e.g. hydroxyl groups, ketone groups, aldehyde groups, carboxyl groups and ester groups. While the presence of some oxygenated functions such as the carboxyl groups and the ester groups is not harmful to the polymer or its uses, the chain scission which brought about their formation is harmful. In the prior art oxidized polymers, hydroperoxide groups comprise only a minor amount of the total oxygenated functions pendent from the polymer chain. In accordance with the process of this invention only a small amount of oxygenated functions other than hydroperoxide groups are formed during photooxidation. The amount of oxygenated functions other than hydroperoxide groups in the photooxidized polymers of this invention remains small and never exceeds a minor amount since chain scission does not occur during photooxidation.

The polymer hydroperoxides of this invention are useful, e.g. as curing agents for natural and synthetic rubber, and in cord-bonding, coating applications and graft polymerization.

The polymers that can be photooxidized in accordance with this invention are those which contain intralinear C=C unsaturation in the chain. The present invention is particularly concerned with photoxidation of hydrocarbon polymers containing olefinic unsaturation, but is not limited thereto, as any unsaturated compounds containing the $H_2C=C<$ groups, that is, vinylidene compounds which are compounds containing a terminal methylene group attached by double bond to a carbon atom, or other polymers containing intralinear C=C unsaturation in the chain can be photooxidized according to the process of the present invention regardless of whether other groups are present in the molecule. In general the polymeric backbone will be hydrocarbon in structure while any halide, ester, ether, hydroxyl or other groups present in the polymer molecule are appended to the polymeric backbone.

It will be understood that the vinyl compounds are a specie of vinylidene compounds since they contain the characteristic

group, one of the valences being connected to H to form vinyl groups, and that the term vinylidene compound as used in the specification and appended claims includes both vinylidene and vinyl compounds.

Illustrative examples of these olefinically unsaturated polymers include natural rubbers; polymers and copolymers prepared from diolefins such as butadiene, isoprene, 2,3 - dimethyl - 1,3 - butadiene, piperylene, chloroprene, bromoprene, 2 - acetoxy - butadiene-1,3, 2-methylpentadiene, 2-ethylhexadiene, and copolymers prepared from diolefins such as those aforementioned and compounds containing a vinylidene ($CH_2=C<$) group such as:

(a) Vinyl ethers, e.g. vinyl ethyl ether, vinyl butyl ether, vinyl octyl ether, vinyl dodecyl ether, vinyl tetradecyl ether, vinyl hexadecyl ether, vinyl octadecyl ether, vinyl ethenyl ether, vinyl octenyl ether, vinyl tetradecenyl ether, vinyl octadecenyl ether;

(b) Vinyl esters, e.g. vinyl acetate, vinyl butyrate, vinyl caprylate, vinyl caprate, vinyl laurate, vinyl myristate, vinyl palmitate, vinyl stearate;

(c) Vinyl halides, e.g. vinyl chloride, vinyl bromide;

(d) Vinyl ketones, e.g. vinyl methyl ketone;

(e) Vinyl sulfides, e.g. vinyl ethyl sulfide;

(f) Vinylidene compounds, e.g. vinylidene chloride;

(g) Acrylic or methacrylic acids and their derivatives, e.g. acrylonitrile, methacrylamide;

(h) Acrylic esters, e.g. methyl methacrylate, ethyl acrylate, propyl acrylate, amyl acrylate, heptyl acrylate, nonyl acrylate, undecyl acrylate, tetradecyl acrylate, hexadecyl acrylate, octadecyl acrylate, ethenyl acrylate, dodecenyl acrylate, octadecenyl acrylate;

(i) Allyl esters, e.g. allyl acetate, allyl butyrate, allyl caprylate, allyl caprate, allyl laurate, allyl myristate, allyl palmitate, ally stearate;

(j) Allyl ethers, e.g. allyl ethyl ether, allyl octyl ether, allyl dodecyl ether, allyl tetradecyl ether, allyl hexadecyl ether, allyl octadecyl ether, allyl ethenyl ether, allyl octenyl ether, allyl tetradecenyl ether, allyl octadecenyl ethers;

(k) Cycloaliphatic vinyl compounds, e.g. vinyl cyclohexene;

(l) Aryl vinyl compounds, e.g. styrene, vinylbiphenyl, vinylnaphthalene and the ar-chloro substituted styrenes;

(m) Heterocyclic vinyl compounds, e.g. vinyl pyridine and vinyl dihydropyrane;

(n) Alpha-olefins, e.g. ethylene, propylene, butene-1, octene - 1, dodecene-1, tetradecene-1, hexadecene-1 and heptadecene-1, dichloroethylenes, tetrafluoroethylene; and (o) Terminal olefins, e.g. isobutylene, isoamylene, 2,3, 3-trimethyl-1-butene.

It is to be understood that the unsaturated polymers which are photoxidized in accordance with this invention can also be prepared by copolymerization of two or more different diolefins, e.g. from a mixture of butadiene and piperylene, either in the presence or absence of one or more non-dienic copolymerizable monomers.

The preferred vinylidene monomers are those having at least one of the disconnected valences attached to an electronegative group such as a double or triple bond e.g. vinyl, phenyl, nitrile, carboxy and the like. The preferred vinylidene monomers are represented e.g. by the classes of monomers listed hereinbefore in (a), (b), (c), (d), (g), (h), (k), (l), (m) and (o). The hydrocarbon vinylidene monomers represented by monomer classes (l) and (o) are particularly preferred. The amount of copolymerized diolefin in a copolymer of diolefin monomer and vinylidene monomer is generally from about 0.1% to 99% by weight. However, when polymer hydroperoxides of copolymerized diolefin monomers and vinylidene monomer are used in the curing of rubber it is preferred that they contain at least about 1% by weight of copolymerized diolefin monomer.

The physical characteristics of the olefincally unsaturated polymer which can be photoxidized in accordance with the present invention may vary from low molecular weight polymer oils containing relatively few olefinic bonds to high molecular weight rubbers and resins such as those resulting from the polymerization or copolymerization of diolefins in the presence or absence of one or more non-dienic copolymerizable monomers.

The term "photoxidizing," "photoxidation," "photosensitized," etc., as used herein in the specification and claims are intended to cover the true photosensitized oxidation reactions in which light in the presence of a photosensitizing catalyst causes the oxygen to oxidize the polymer; the terms are not intended to include autoxidations, proceeding by a free radical mechanism in which irradiation with light serves to initiate free radicals. The true photosensitized oxidation reactions are characterized by the fact that the rate of the reaction is approximately proportional to the intensity of irradiation at both high and low intensities, and the fact that in general ordinary oxidation inhibitors do not retard the reaction.

The photoxidation reaction utilized in the present invention can be postulated according to the following equations, in which a unit of polyisoprene is employed as an examplification of internally unsaturated polymers:

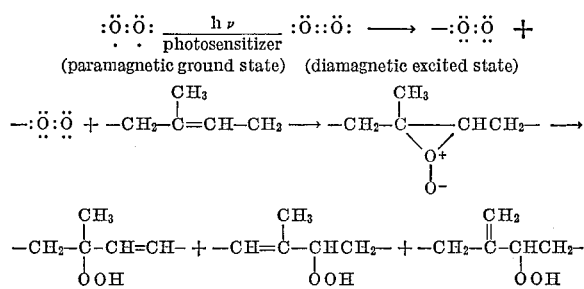

In these reactions, a photosensitizer must be present to catalyze the conversion of the molecular oxygen in the ground state to an activated polarizable state. Light is also necessary to effect this reaction. The irradiating light can vary considerably in wave length, wave lengths in the visible regions being preferred. The light can be monochromatic or polychromatic. Light of wave lengths in the range of 3600 to 8000 Angstroms has been found very suitable. While light in the ultra-violet region, particuluarly the near ultra-violet region, can be used as it is effective to some extent in causing photoxidation, it is desirable to avoid use of light in these regions as it tends to catalyze autoxidations and other free-radical type reactions. High-energy ultra-violet light may also cause accelerated catalyst photo-decomposition. Catalyst photo-decomposition occurs when the amount of ultra-violet light absorbed by the photosensitizing catalyst is sufficient to rupture chemical bonds within the photo-catalyst molecule thus destroying its structural integrity and leading to polymer degradation products.

It will be realized that the photoxidation utilized in the present invention proceeds in a manner different from autoxidations occurring by a free radical mechanism; in the latter case, the free radical formation occurs on a carbon atom alpha to the original double bond, and the hydroperoxide is then formed on this carbon atom, or in the event of an isomeric shift, on another carbon atom alpha to the original bond, rather than on one of the carbon atoms of the original double bond. The photoxidation utilized in the present invention also differs from the thermal oxidation of olefins, in which an epoxide is formed directly across the original position of the double bond.

The polymer hydroperoxides of this invention can vary widely in hydroperoxide content, depending on the end application for which they are intended. For crosslinking sites in coating applications it is generally desirable to have about 1 hydroperoxide group for each 10 carbon atoms in the polymer chain but not more than about 1 hydroperoxide group for each 100 carbon atoms in the polymer chain. However, there may be considerable variation in the number of hydroperoxide groups depending upon the degree of crosslinking desired, e.g. from 1 hydroperoxide group for each 5 atoms in the polymer chain to 1 hydroperoxide group for each 500 or more atoms in the polymer chain. When the polymer hydroperoxides of this invention are used as curing agents for natural and synthetic rubber it is generally desirable that they have from about 1 hydroperoxide group for each 20 carbon atoms to about 1 hydroperoxide group for each 500 carbon atoms in the polymer chain. Polymer hydroperoxides having from about 1 hydroperoxide group for each 25 carbon atoms to about 1 hydroperoxide group for each 100 carbon atoms are preferred as curing agents. It will be appreciated that for other uses there can be even wider variation in the number of hydroperoxide groups, e.g. from about 1 hydroperoxide group for each 5 carbon atoms to 1 hydroperoxide group for 1000 or more atoms in the polymer chain. Ordinarily the referred to atoms in the polymer chain are carbon atoms, but the presence of other atoms which do not interfere with the photoxidation is to be understood as within the invention.

The present invention is concerned with photoxidizing polymers containing a plurality of unsaturated carbon--to-carbon bonds and with the resulting polymer hydroperoxides which have a plurality of hydroperoxide groups, preferably 5 or more, in each molecule. It will be recognized that the aforementioned numbers of hydroperoxide groups represent varying degrees of the theoretically possible number of hydroperoxide groups in each molecule, depending upon the number of unsaturated carbon-to-carbon bonds in each molecule. Thus, in a highly unsaturated rubber such as a polybutadiene, the number of hydroperoxide groups is often about 3% of theory, i.e. 3 hydroperoxide groups for each 100 olefin bonds, and numbers in the range of 0.1% to 75% of theory are generally useful whereas with a Butyl rubber (isoprene-isobutylene copolymer) a comparable number of hydroperoxide groups may be 20% of theory and it may generally be desirable to employ numbers representing 10% to 100% of theory. It is therefore evident that an equal number of substituted hydroperoxide groups may represent from a small percent to 100% of the theoretical substitution depending on the specific polymer employed.

The following examples will serve to illustrate the present invention. Parts and percent are by weight unless otherwise indicated.

EXAMPLE 1

A conventional 14 unit Bronwill Scientific Warburg apparatus was provided with a circle-line circular 14-watt "standard cool white" fluorescent light specifically fabricated to fit the apparatus. This light was placed below the "Lucite" constant temperature bath (25° C.) to provide uniform illumination of the vessel from below. Solutions of various natural and synthetic rubbers were made up in trichloromethane at various concentrations and a 3 ml. portion of each solution was photoxidized in the Warburg apparatus with air employing $\alpha,\beta,\gamma,\delta$-tetraphenylporphine as a catalyst at a concentration of $1.36 \times 10^{-5}$ mole/liter. The oxygen uptake at 25° C. under illumination was then measured. Results and further details are given below:

| Rubber | Concentration of Rubber Mg./ml. | N [1] | Oxygen absorbed Microliters | Microliters/hr. |
|---|---|---|---|---|
| Cis polybutadiene | 0.025 | 0.46 | 66 | 84 |
| Do | 9.0125 | 0.23 | 50 | 73 |
| Natural rubber (Hevea) | 9.0188 | 0.22 | 204 | 260 |
| Natural rubber (smoked sheet) | 0.0188 | 0.22 | 206 | 247 |
| Polychloroprene (Neoprene W) | 0.0195 | 0.22 | 14 | 19 |
| Butadiene/acrylonitrile [2] Copolymer (Hycar 1043) | 0.0165 | 0.22 | 7 | 19 |
| Styrene/butadiene [3] Copolymer (SBR 1502) | 0.0156 | 0.22 | 10 | 21 |
| Isoprene/isobutylene [4] Copolymer (Butyl 215) | 0.150 | 0.04 | 60 | 109 |

[1] Normality with respect to carbon to carbon double bond content.
[2] Styrene/acrylonitrile rubber containing 70% styrene.
[3] Styrene/butadiene rubber containing 24% styrene.
[4] Isoprene/isobutylene rubber containing 1.7% isoprene.

The rubber latices photoxidized in Examples 2–6 in accordance with this invention are identified as follows:

SBR 1500—Styrene-butadiene rubber latex containing 23.5% bound styrene, no stabilizer, 25% solids.

SBR 1502—Styrene-butadiene rubber latex containing 24% bound styrene, no stabilizer, 25% solids.

SBR 2000—Styrene-butadiene rubber latex containing 50% bound styrene, no stabilizer, 43% solids.

Natural rubber—Hevea rubber, no stabilizer, 62.7% solids.

Dow latex 512K—Styrene-butadiene rubber latex containing 60% bound styrene, 48% solids—a product of the Dow Chemical Company.

EXAMPLE 2

A 0.250 gram amount of $\alpha,\beta,\gamma,\delta$-tetraphenylporphine was treated with a small amount of acetone and gradually dissolved therein by successively heating and adding additional portions of acetone to prepare a 1 liter solution ($4.0 \times 10^{-4}$ mols/liter). To 10 ml. of this solution, 1 gram of an emulsifying agent was added and the solution diluted to 100 ml. with distilled water. The emulsifying agent used was a 50/50 mixture of an isooctylphenoxypolyethoxyethanol (Triton X–100) and a sodium salt of alkyl aryl polyether sulfate (Triton X–770). Samples for photoxidation were prepared by adding 1 ml. of the catalyst emulsion to 2 ml. of various rubber latices and the samples were photoxidized in the Warburg at 21° C. with air. Results and further details are presented below:

| Rubber latex | Oxygen absorbed, microliters | | | |
|---|---|---|---|---|
| | 15 min. | 30 min. | 45 min. | 60 min. |
| Styrene/butadiene SBR 1502 | 4 | 12 | 21 | 30 |
| Styrene/butadiene SBR 2000 | 11 | 26 | 38 | 53 |
| Natural Rubber (Hevea) Latex | 6 | 12 | 22 | 30 |
| Latex Paint Base (Dow 512-K) | 5 | 11 | 20 | 28 |

The oxygen absorption demonstrates that all the latices were photoxidized.

Example 2 is repeated using Rose Bengal and hydroxyphenylphorphine as catalysts in place of $\alpha,\beta,\gamma,\delta$-tetraphenylporphine and with all other conditions the same. Results comparable to those of Example 2 are obtained with these catalysts.

EXAMPLES 3–6

The catalyst emulsion used in Examples 3 and 4 was prepared as follows: A 0.025 gm. amount of $\alpha,\beta,\gamma,\delta$-tetraphenylporphine was dissolved in 10 ml. of pyridine and 2 gm. of an emulsifier, a 50/50 mixture of an isooctylphenoxypolyethoxyethanol (Triton X–100) and a sodium salt of an alkyl aryl polyether sulfate (Triton X–770), was added thereto. This pyridine solution was then added to 100 ml. of distilled water to form a catalyst emulsion containing $4.08 \times 10^{-4}$ mols/liter of catalyst.

The catalyst solution used in Examples 5 and 6 was prepared as follows: An 0.025 gm. amount of $\alpha,\beta,\gamma,\delta$-tetraphenylphorphine was dissolved in 10 ml. of pyridine. This pyridine solution was then added to 90 ml. of distilled water to form the catalyst solution.

The rubber latices of Examples 3–6 were photoxidized by the following procedure: In a 300-ml. flat sided, cylindrical, three-neck flask fitted with a thermometer, a hollow shaft, high speed, gas dispersing stirrer and connected to a Dry Ice cooled reflux condenser was placed 200 gms. of rubber latex. In Examples 3 and 4, 25 ml. of catalyst emulsion prepared as noted hereinbefore was added to the rubber latex. In Examples 5 and 6, 25 ml. of catalyst solution prepared as noted hereinbefore was added to the rubber latex. The flask was partially submerged in a water bath (21° C.) and while the flask was illuminated with two 500-watt Photospot tungsten lamps (G.E. PAR-500), oxygen was passed into the flask for about 2 hours. The amount of oxygen absorbed was measured by the difference between oxygen gas metered to the flask and that leaving the flask. Results and further details are presented below:

| Ex. No. | Rubber latex | Oxygen, ft.³/hr. | Substituted hydroperoxide groups [1] | | | |
|---|---|---|---|---|---|---|
| | | | 30 min. | 60 min. | 90 min. | 120 min. |
| 3 | Styrene/butadiene SBR 2000. | 0.874 | 1.1 | | [2] 5.7 | |
| 4 | Natural rubber (Hevea) Latex. | 0.725 | 1.9 | 2.7 | 4.0 | 6.0 |
| 5 | Styrene/butadiene SBR 1502. | 0.776 | 1.1 | | 4.1 | 5.4 |
| 6 | Styrene/butadiene SBR 1500. | 1.391 | 1.4 | 3.4 | 6.5 | 8.2 |

[1] As percent of theory.
[2] Run stopped at 90 min.

The theory formula for the styrene/butadiene copolymer (50/50) of Example 3 is $C_{8.16}H_{10.16}$. The analytical formulas of the copolymer prior to photoxidation was $C_{8.16}H_{10.8}O_{0.24}$. The analytical formula of the copolymer after photoxidation was $C_{8.16}H_{10.9}O_{0.33}$. The gain 0.09 oxygen atoms indicates 4.5% of theory substitution and compares favorably to the 5.7% of theory substitution determined by gas measurement.

The above examples show that polymers containing intralinear C=C unsaturation in the chain can be photoxidized by the process of the present invention, and that such polymers will vary in their photoxidation, photoxidation rates, etc. It is evident, however, that the present process concerns introducing oxygen into polymer units without destruction thereof to form a polymer having hydroperoxide groups attached to carbon atoms which were the original double bond carbon atoms in the unmodified polymer and which are adjacent to carbon-to-carbon double bonds in the photoxidized polymer.

As mentioned hereinabove the polymer hydroperoxides of this invention are useful, e.g. as curing agents for both natural and synthetic rubber, in cord bonding, coating applications and graft polymerization. The following examples illustrate some of the many uses for the polymer hydroperoxides of this invention.

EXAMPLE 7

Example 7 illustrates the improved properties of surface coatings prepared from the photoxidized latices of this invention.

Photoxidized Dow 512K latex (43% substituted hydroperoxide groups) prepared in the manner of Example 6 was coated on aluminum, glass, steel and tin plate at a wet coat thickness of 4 mils. Control sheets of aluminum, glass, steel and tin plate were coated with unmodified Dow 512K latex at a wet coat thickness of 4 mils. The coatings were cured at 150° C. for 30 minutes and then placed outdoors at Dayton, Ohio, from Oct. 4, 1960, to Nov. 8, 1960. At the end of this period the photoxidized latex coatings were uniformly and markedly superior to the unmodified latex coatings. The unmodified coatings developed checking outdoors, a characteristics aging pattern for styrene-butadiene paint films, but the photoxidized coatings showed no checking and retained good gloss.

The solvent resistance of photoxidized latex coatings is superior to that of unmodified latex coatings. The unmodified Dow 512K latex coatings whitened in water, 5% aqueous sodium hydroxide and 50% aqueous solutions of ethyl alcohol whereas photoxidized Dow 512K latex coatings were unaffected by the first two aforementioned solvents and softened only slightly with the third solvent.

EXAMPLE 8

This Example 8 illustrates the improved clarity of graft copolymers prepared from styrene and photoxidized rubber as compared to those prepared from styrene and unmodified rubber. The procedure used in Example 8 was as follows: Glass containers were charged with 50 gm. (45 ml.) of styrene and 5 gm. of rubber, purged with nitrogen and sealed. The glass containers were placed in an oven and heated for 9 hr. at 70° C., 12 hr. at 90° C., 24 hr. at 120° C. and then 8 hr. at 180° C. At the end of this period, the containers were opened and the graft copolymers were removed and subjected to physical testing. Results and further details are given below.

| Sample No. | Monomer | Rubber | Graft copolymer clarity |
|---|---|---|---|
| 1a | Styrene | Cis-polybutadiene-hydroperoxide.[1] | Transparent. |
| 1b | do | Cis-polybutadiene [2] | Poor. |
| 1c | do | do [3] | Do. |
| 2a | do | Natural (Hevea) rubber-hydroperoxide.[4] | Clear. |
| 2b | do | Natural rubber (Hevea) [2] | Opaque. |
| 2c | do | do [3] | Do. |

[1] Substituted hydroperoxide groups at 2.9% of theory.
[2] The rubber was subjected to the same photoxidation conditions as the photoxidized rubber but without a photosensitizing catalyst present.
[3] Unmodified.
[4] Substituted hydroperoxide groups at 14.2% of theory.

The process of the present invention is effected by contacting a polymer suitable for photoxidation with oxygen in the presence of a photosensitizing catalyst and simultaneously irradiating with light. The contacting is most suitably effected in liquid media, particularly by passing oxygen or oxygen-carrying gas through a solution or dispersion of polymer and photosensitizing catalyst while simultaneously irradiating with light. The reaction rate of the photoxidation will depend upon the intensity of the irradiation. Generally, it is desirable to use a light source of at least 500 or 1000 watts and to have an intensity of illumination on a surface of the photoxidation medium of at least 1000 foot-candles of light when light of wavelengths suitable for illumination is employed, or equivalent energies of light of other wavelengths. The irradiation can be effected by illuminating a photoxidation reaction vessel with suitable light, particularly by concentrating the light beam on the vessel by use of reflectors, lenses or other suitable means; or if desired, the light source can be placed in a well in the reaction vessel. In general, it is desirable to agitate the photoxidation medium in order to constantly change that portion of the medium proximate to the light source.

The photoxidation can be conducted advantageously with both the polymer to be photoxidized and the photosensitizing catalyst in solution although this is not required. When conducting the photoxidation in solution the choice of solvent depends only on the solubility characteristics of the particular polymer, but in general hydrocarbon solvents are suitable, particularly alkanes, e.g., n-pentane, n-hexane, isooctane, n-octane, nonane, decane and the like, or aromatic solvents, e.g. benzene, toluene and the like. Amine solvents, e.g. pyridine and the like, are also suitable and may be used if desired. In certain situations, for example graft polymerization, it may be desirable to use a monomer as solvent and to conduct the subsequent graft polymerization in the same medium as the photoxidation. Photoxidation can be effected with the unsaturated polymer, for example natural rubber, dissolved in styrene monomer and then subsequent graft polymerization reactions can be conducted. In this manner the expense of an organic solvent which serves no other function and is generally removed prior to graft polymerization is avoided.

Rubber in the form of a latex may be photoxidized by the process of the present invention. Any emulsion or dispersion of rubber in liquid media can be employed. The commercial rubber latices commonly involve aqueous media and photoxidation in such media will be of primary interest. Both cationic and anionic rubber emulsions and dispersions can be used and such emulsions and dispersions can contain any of the various emulsifying or stabilizing agents employed in the art, including the various long chain fatty acid or other anionic surfactants. Natural rubber latex containing various proteins or ammonium stabilizers can be employed. As rubber polymers are often prepared and utilized in emulsions the use of the emulsion form for the photoxidation reactions of the present invention will be particularly advantageous. Furthermore, in some aspects the use of aqueous emulsions is more convenient than using true solutions as the expense of the organic solvent is avoided. The photoxidation catalyst does not have to be dissolved in the rubber emulsion as such catalysts are very effective when merely dispersed in the emulsion. The catalysts can be dispersed in the emulsions by agitation or other methods of mixing, but it may be desirable in some instances to first dissolve the catalyst in a solvent, preferably a water-miscible solvent, and to then add the catalyst solution to the rubber emulsion.

The amount of oxygen employed should be at least sufficient so that the amount does not affect the photoxidation rate, i.e. to obtain the maximum utilization of light energy, it is desirable to have sufficient oxygen present so that the photoxidation rate will be the maximum obtainable with the particular light source, photoxidation catalyst and other conditions involved. It is preferred that an excess quantity of oxygen be employed. The necessary oxygen is generally provided by supplying oxygen at a rate at least as great as that at which it is absorbed by the polymers. When a stream of oxygen or oxygen-carrying gas is being passed through the reaction medium, the presence of substantial amounts of oxygen in the off-gas indicates that sufficient oxygen is present. When a static system is employed sufficient oxygen will be provided to insure that excess oxygen is present in the reaction medium or the space immediately above.

Various types of agitators, mixer and gas-liquid contact apparatus and procedures can be utilized to insure a sufficiently high effective oxygen concentration, thereby promoting rapid absorption of oxygen by the polymers. The concentration of oxygen can also be increased by use of pressure. Oxygen gas can be utilized as such or it can be admixed with nitrogen or other gases. Air is an oxygen-carrying gas which is suitable for use in the photoxidation process of this invention. It will be understood that the term "oxygen" as used in the present specification and claims includes molecular oxygen in admixture with air or other gases, or dissolved in or admixed with liquids, or generated in situ, as well as oxygen per se.

Temperature does not have a strong influence on the photoxidation reactions of this invention. However, it is necessary that the reaction medium be at a temperature below which the substituted hydroperoxide groups become thermally unstable and subsequent depolymerization occurs. In general the photoxidation can be carried out at temperatures from below 0° C. to those where thermal unstability of hydroperoxide groups occurs and this upper limit will vary widely depending upon the particular polymer and number of substituted hydroperoxide groups thereon. Temperatures of the order of room temperature, e.g. 20° C. to 30° C. will generally be used.

In the reactions of the present invention, a photosensitizer must be present, presumably to catalyze the conversion of the oxygen in the ground state to an active polymerizable state. Any photosensitizer can be employed, although some will be many times more effective than others and some will be of little value in actual practice. In general, it is preferred to employ a porphine type catalyst in the present invention, for example porphines or the related porphyrazines, phthalocyanines or chlorophylls. For simplicity, any compound having the basic porphine structure, i.e. four pyrrole rings connected by

groups, is considered a porphine.

The amount of photosensitizer can vary widely, but ordinarily only small "catalytic" amounts will be used. For example, amounts of about 0.1% based on the weight of unsaturated polymer are generally satisfactory. Various other amounts, e.g. from about .01% to 1.0% based on the weight of unsaturated polymer have been used in photoxidations along the lines of the foregoing examples with good results.

Particularly useful photosensitizing catalysts for the present invention are the aromatic group meso-substituted porphine compounds. Among such aromatic-substituted porphines are the ms-tetraarylporphines. Porphines are the class of compounds in which four pyrrole nuclei are linked together in a circular pattern by four carbon atoms so that a great ring containing 16 atoms is formed; in the meso-tetraarylporphine catalysts, phenyl (or other aryl) groups are substituted on the bridging carbon atoms and such phenyl groups as, for example, phenyl, chlorophenyl, dichlorophenyl, methylphenyl, N,N-dimethylaminophenyl, hydroxyphenyl; etc., are applicable. Other aryl group substituents on the bridging carbon atoms such as the di-, tri-, and tetracyclic aryl groups can be used, e.g., meso-naphthyl-substituted porphines are very effective photosensitizing catalysts; anthracyl and phenanthryl groups are also effective. The porphine catalysts, including the aryl porphine catalysts, can have various other substituents, particularly at the β and β' positions of the pyrrole rings, for example, such substituents as ethyl, methyl, vinyl, and propionic acid groups, etc., or benzo groups linking two positions of a given pyrrole ring, and such substituents can be present in the tetraphenylporphine catalysts used in the present invention. In addition to the substituents in the phenyl groups noted above, the phenyl or aryl groups in the photosensitizing catalysts can have any or a combination of such substituents, for example, as alkyl groups, e.g. methyl, ethyl, propyl, isopropyl, n-butyl, isobutyl, n-amyl, isoamyl, hexyl, decyl, dodecyl, etc., alkoxy substituents, e.g. methoxy, ethoxy, isopropoxy, butoxy, hexyloxy, etc.; halogen substituents, e.g. bromine, chlorine, fluorine and iodine, and any other substituents which do not change the fundamental aromatic character of the groups. As used herein, the terms aryl and phenyl are intended to include all groups which are essentially aromatic and which contain one or more benzene rings.

The aforesaid aryl porphines can be prepared according to procedures set forth in U.S. Patent No. 2,950,237. Other suitable aromatic substituted porphine catalysts are octaphenylporphines and porphrazines as set forth in U.S. Patent No. 2,951,798; or meso-heterocyclic substituted porphines as set forth in U.S. Patent No. 2,951,799; or benzoporphines as set forth in U.S. Patent No. 2,951,800; or the porphyrazines set forth in U.S. Patent No. 2,951,797. The disclosure of all of the foregoing catalysts, even fundamental porphine structures having little or no substitution, e.g. porphine itself, will be useful to some extent in the present invention. Similarly, other photosensitizing catalysts can be used even though the results are inferior. For example, such materials as chlorophyll, eosin, methylene blue, methyl violet, fluorescein, hemin, rubrene, anthracene, tetracene, acridine, and any other catalysts capable of photosensitization in photoxidation procedures can be used. It is also possible to utilize phthalocyanines for this purpose. The above materials can be in any form capable of causing photosensitization; e.g. any of the pure or impure forms of chlorophyll, leaf extracts, etc., can be used so long as they cause photosensitization.

What is claimed is:

1. The process which comprises contacting with oxygen a diolefin polymer in a liquid diluent or a latex of said polymer, in the presence of from about 0.1% to 1.0% by weight of the polymer of a photosensitizing catalyst and while irradiating with visible light, to obtain a polymer hydroperoxide wherein the hydroperoxide group is attached to a carbon atom of the unruptured polymer chain.

2. The process of claim 1 wherein the polymer is natural rubber.

3. The process of claim 1 wherein the polymer is a copolymer of diolefin monomer and monomer containing intralinear C=C unsaturation.

4. The process of claim 1 wherein the polymer is polybutadiene.

5. The process of claim 1 wherein the polymer is styrene/butadiene.

6. The process of claim 1 wherein the polymer is butadiene/acrylonitrile.

7. The process of claim 1 which is carried out in the presence of an organic solvent for the polymer.

8. The process of claim 1 which is carried out with the polymer in latex form.

9. The process of claim 1 wherein the polymer is irradiated with light of wave length in the range of about 3600 to 8000 angstroms.

References Cited

UNITED STATES PATENTS

| 2,979,488 | 4/1961 | Carpenter | 260—94.3 |
| 2,727,857 | 12/1955 | Carter | 204—161 |
| 2,911,398 | 11/1959 | Vandenberg | 260—93.5 |
| 2,951,800 | 9/1960 | Sharp | 204—162 |
| 2,996,515 | 8/1961 | Moore et al. | 260—340.3 |
| 3,322,661 | 5/1967 | Yoshiwaka | 260—877 XR |

FOREIGN PATENTS

| 637,594 | 4/1948 | Great Britain. |
| 774,752 | 6/1955 | Great Britain. |

OTHER REFERENCES

Journal Am. Chem. Soc., vol. 79, pages 3137–3141, June 20, 1957, R. J. Orr and H. Leverne Williams.

Catalytic Photochemical Electrolytic Reactions, vol. II Interscience Publishers, Inc., New York, 1956, Photosensitized Oxidations pages 351–355, by C. R. Masson, V. Bolkelheide, W. A. Noyes, Jr. (Copy in Group 140).

JOSEPH L. SCHOFER, Primary Examiner

WILLIAM HAMROCK, Assistant Examiner

U.S. Cl. X.R.

204—161, 162; 260—29.7, 83.3, 85.1, 85.3, 92.3, 94.7, 96, 773.

UNITED STATES PATENT OFFICE
CERTIFICATE OF CORRECTION

Patent No. 3,484,353                      December 16, 1969

Dexter B. Sharp

It is certified that error appears in the above identified patent and that said Letters Patent are hereby corrected as shown below:

Column 2, line 51, "ally" should read -- allyl --. Column 3, line 16, after "copolymerized diolefin" insert -- monomer --; line 23, "olefincally" should read -- olefinically --; lines 54 and 55, the formula should appear as shown below:

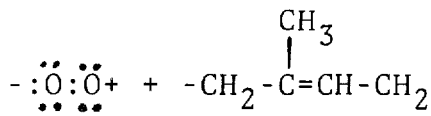

same column 3, line 69, "monchromatic" should read -- monochromatic --. Column 4, line 16, "to the original bond" should read -- to the original double bond --. Column 5, line 20, "9.0125" should read -- 0.0125 --; line 21, "9.0188" should read -- 0.0188 --; line 22, "(smoked sheet" should read -- (smoked sheet) --; line 32, "contalning" should read -- containing --. Column 9, line 13, "mixer" should read -- mixers --.

Signed and sealed this 16th day of June 1970.

(SEAL)
Attest:

EDWARD M.FLETCHER,JR.            WILLIAM E. SCHUYLER, JR.
Attesting Officer                   Commissioner of Patents